US008711227B2

United States Patent
Komiyama et al.

(10) Patent No.: US 8,711,227 B2
(45) Date of Patent: Apr. 29, 2014

(54) DIGITAL CAMERA DOCK HAVING MOVABLE GUIDE PINS

(75) Inventors: Hiroshi Komiyama, Nagano (JP); Toyoo Kiuchi, Kawasaki (JP); Eiki Kondo, Tokyo (JP); Toshihide Kasahara, Tokyo (JP)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 430 days.

(21) Appl. No.: 12/464,147

(22) Filed: May 12, 2009

(65) Prior Publication Data

US 2009/0219399 A1 Sep. 3, 2009

Related U.S. Application Data

(62) Division of application No. 11/566,251, filed on Dec. 4, 2006, now abandoned.

(30) Foreign Application Priority Data

Apr. 28, 2006 (JP) .................................. 2006-126571

(51) Int. Cl.
*H04N 5/225* (2006.01)

(52) U.S. Cl.
USPC .................... 348/207.1; 348/207.99; 348/373; 361/679.41

(58) Field of Classification Search
USPC .......... 348/207.1, 207.99, 373; 439/135–145, 439/269.1–269.2, 445–448; 461/679.41
See application file for complete search history.

(56) References Cited

U.S. PATENT DOCUMENTS

| 4,954,092 | A | * | 9/1990 | Fransson et al. | 439/152 |
| 5,682,228 | A | * | 10/1997 | Miyake | 355/75 |
| 7,090,521 | B2 | | 8/2006 | Nishio et al. | |
| 7,201,594 | B2 | | 4/2007 | Van Der Mee et al. | |
| 7,359,185 | B2 | | 4/2008 | Hiroyoshi | |
| 7,628,628 | B2 | * | 12/2009 | Matsuda et al. | 439/248 |
| 7,719,613 | B2 | * | 5/2010 | Kayanuma | 348/375 |
| 7,922,510 | B2 | * | 4/2011 | Klinger et al. | 439/247 |
| 2002/0071035 | A1 | | 6/2002 | Sobol | |
| 2004/0004671 | A1 | * | 1/2004 | Takahashi | 348/375 |
| 2004/0201774 | A1 | * | 10/2004 | Gennetten | 348/375 |

(Continued)

FOREIGN PATENT DOCUMENTS

IL  Hei 6-45278  6/1994

OTHER PUBLICATIONS

Non-Final Office Action on U.S. Appl. No. 12/464,134, mailed May 2, 2013.

(Continued)

*Primary Examiner* — Antoinette Spinks

(57) ABSTRACT

Use of a custom insert is obviated when a digital camera is attached to a base (dock). Two movable pins are provided, in such a way that a connector is sandwiched between the movable pins, on a digital camera attachment surface of a base (dock) which provides a digital camera with a recharging function and a printing function. The movable pins fit to holes in a bottom of the digital camera to thus act as guides during the course of attachment of the digital camera. Alternatively, the attachment surface itself may be configured so as to be vertically movable, and the attachment surface may descend during attachment of the digital camera and the attachment surface may be latched in a lower position after attachment of the same.

10 Claims, 11 Drawing Sheets

(56) References Cited

U.S. PATENT DOCUMENTS

| | | | |
|---|---|---|---|
| 2004/0204166 A1 | 10/2004 | Bae | |
| 2004/0233282 A1* | 11/2004 | Stavely et al. | 348/143 |
| 2004/0239772 A1 | 12/2004 | Onishi et al. | |
| 2005/0088572 A1* | 4/2005 | Pandit et al. | 348/375 |
| 2005/0185205 A1 | 8/2005 | Eckhaus et al. | |
| 2005/0248917 A1 | 11/2005 | Hiroyoshi | |
| 2006/0105603 A1* | 5/2006 | Nishio et al. | 439/247 |
| 2006/0268162 A1* | 11/2006 | Kayanuma | 348/375 |
| 2009/0073642 A1* | 3/2009 | Jubelirer et al. | 361/679.01 |
| 2009/0168312 A1* | 7/2009 | Motoe et al. | 361/679.01 |

OTHER PUBLICATIONS

Final Rejection on U.S. Appl. No. 12/464,134, mailed Dec. 12, 2011.
Final Rejection on U.S. Appl. No. 12/464,134, mailed Jul. 18, 2012.
Non-Final Office Action on U.S. Appl. No. 11/566,251, mailed Apr. 29, 2009.
Non-Final Office Action on U.S. Appl. No. 12/464,134, mailed Mar. 16, 2012.
Non-Final Office Action on U.S. Appl. No. 12/464,134, mailed Jun. 10, 2011.
Notice of Allowance on U.S. Appl. No. 12/464,134, mailed Oct. 22, 2013.

* cited by examiner

DIGITAL CAMERA DOCK HAVING MOVABLE GUIDE PINS

CROSS REFERENCE TO RELATED APPLICATIONS

This is a Divisional of application Ser. No. 11/566,251 filed Dec. 4, 2006 now abandoned which claims the benefit of Japanese Patent Application No. 2006-126571 filed on Apr. 28, 2006, which is incorporated herein by reference in its entirety.

FIELD OF THE INVENTION

The present invention relates to a digital camera dock, and more particularly, to a dock which is electrically connected to a digital camera to thus provide the digital camera with various functions, such as a recharging function, a printing function, and the like.

BACKGROUND OF THE INVENTION

A digital camera dock (hereinafter simply referred to as a "dock") which is connected to a digital camera and provides the digital camera with a recharging function and a printing function has hitherto been developed. For instance, the recharging dock supplies recharging power to the digital camera through use of an a.c. power source. A recharged state of a built-in battery of the digital camera is displayed on an indicator of the digital camera or an indicator of the dock. The user can recharge the digital camera by means of simply attaching the digital camera to the recharging dock. The recharging dock may also have a file transfer function of reading image data stored in memory of the digital camera and transferring the image data to the memory of a personal computer. The printer dock receives the image data stored in the memory of the digital camera and outputs the image data while the data are printed on a sheet of photographic paper. By means of simply attaching the digital camera to a printer dock, desired image data can be printed without involvement of a computer. The printer dock may also have the function of recharging a digital camera.

When the digital camera is attached to the dock, there are many cases where a custom insert previously prepared for each digital camera is attached to a dock in order to guide the digital camera during attachment or to protect the connection with a connector after attachment of the digital camera.

FIG. 20 shows that the digital camera 10 is attached to a dock 12. The dock 12 is a printer dock having a print sheet tray 14. A custom insert 16 prepared for each digital camera 10 is attached to an upper surface of the dock 12; i.e., an attachment surface of the digital camera 10. The digital camera 10 is attached to the dock 12 while the custom insert is taken as a guide. More specifically, the custom insert 16 is attached to the attachment section of the dock 12, and the digital camera 10 is attached to the custom insert 16.

FIG. 21 shows the configuration of the custom insert 16 and that of the dock 12. The custom insert 16 has a guide wall 16a complying with the outer shape of the digital camera 10; an opening section 16b formed in the guide wall 16a; and a protuberance section 16c loosely fitting into a tripod threaded hole of the digital camera 10. The opening section 16b is formed at a position which opposes a connector 12a of the dock 12 when the custom insert 16 is attached to the dock 12. The connector 12a of the dock 12 is inserted into the opening section 16b and becomes exposed outside, to thus enable connection with a connector of the digital camera 10. Hooks 16d are provided at the four corners of the bottom face of the custom insert 16 and fit into holes 12b formed in the dock 12, thereby fastening the custom insert 16 to the dock 12. Specifically, when the custom insert 16 is attached to the dock 12, the custom insert 16 is positioned in the attachment section of the dock 12, thereby fitting the hooks 16d into the holes 12b. The hooks 16d are formed from resin; and are inserted and locked into the holes 12b as a result of being deformed during the course of fitting.

Japanese Utility Model Laid-Open Publication No. Hei 645278 describes a configuration for connecting connectors together. One of the connectors is provided with a guide pin and a spring-tensioned movable pin. The other connector is provided with a plane contact and a guide hole.

However, in the configuration where a custom insert is provided for each digital camera, a guide to be provided on the dock, including the guide section of the custom insert, must be provided so as to protrude higher than the connector of the dock, in order to exhibit a function of guiding a connection with the connector. Imposing restrictions on the dock greatly affect the internal configuration of the digital camera, which in turn hinders miniaturization of the digital camera.

SUMMARY OF THE INVENTION

The present invention has been conceived in view of the above drawbacks in the related art, and provides a dock which can obviate a necessity for a custom insert.

The present invention provides a digital camera dock to which a digital camera is to be attached and which has a function of printing an image captured by the digital camera or recharging an internal battery of the digital camera, the dock comprising:

an attachment surface to which the digital camera is to be attached being supported so as to become vertically movable;

a first holding unit for fixedly holding the attachment surface in a first, upper position;

a second holding unit for fixedly holding the attachment surface in a second, lower position; and a control unit for releasing the first holding unit to thus enable vertical movement of the attachment surface, which in a stable state is fixedly held in the first position by means of the first holding unit, when the digital camera is attached onto the attachment surface, and for actuating the second holding unit to thus fixedly hold the attachment surface in the second position when the attachment surface has lowered to thus establish an electrical connection with the digital camera via a connector.

The present invention also provides a digital camera dock to which a digital camera is to be attached and which has a function of printing an image captured by the digital camera or recharging an internal battery of the digital camera, the dock comprising:

a connector for establishing an electrical connection with the digital camera;

movable pins which are formed in the vicinity of the connector and supported in an impelled manner so as to be vertically movable; and an attachment surface to which the digital camera is to be attached and which has the connector and the movable pins, wherein the movable pins project and are impelled upwardly in a stable state, fit to hole sections formed in a bottom of the digital camera during attachment of the digital camera, and move downwardly along with the digital camera to thus act as guides for regulating a relative position between the digital camera and the connector.

The present invention obviates a necessity for use of a custom insert, and lessens restrictions on a digital camera.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTION OF THE INVENTION

Embodiments of the present invention will be described hereinbelow by reference to the drawings.

First Embodiment

Figure 1:
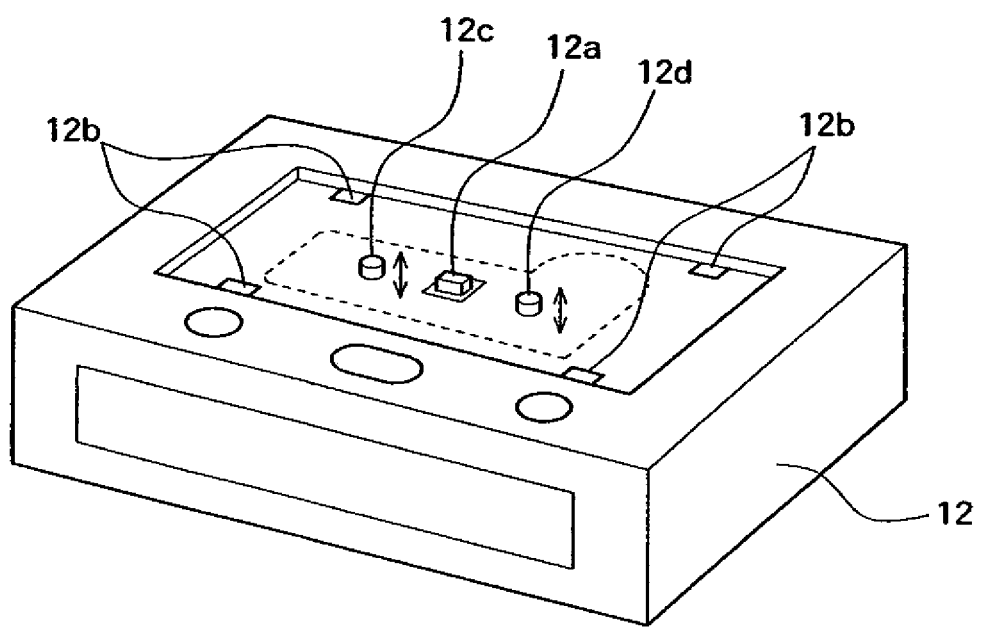
FIG. 1 is a perspective view of a printer dock of an embodiment of the present invention.

FIG. 1 shows the configuration of a dock for use with a digital camera according to a first embodiment. The printer dock provides the digital camera with a recharging function and a printing function.

As shown in FIG. 1, the printer dock 12 has a dock-side connector 12a and holes 12b into which a custom insert 16 is to be fitted. The reason why the holes 12b are provided is because a conventional custom insert can also be made usable in the present embodiment, although the custom insert is not required in the present embodiment. Two movable pins 12c, 12d are formed in a digital camera attachment section of the printer dock 12 in such a way that the connector 12a is interposed between the pins 12c and 12d. As indicated by arrows in the drawing, the movable pins 12c and 12d are elastically supported by springs so as to be vertically movable. The movable pins 12c, 12d have different diameters, and in the drawing the movable pin 12c is larger in diameter than the movable pin 12d. The movable pins 12c and 12d may also be made equal to each other in terms of a diameter. The movable pins 12c and 12d are elastically impelled upwardly in a stable state. A guide line (indicated by a broken line in the drawing) is printed on a digital camera attachment surface for facilitating attachment of the digital camera and guiding the same. The user attaches the digital camera 10 to the printer dock 12 along the guide line.

At the time of attachment of the digital camera 10, the two movable pins 12c and 12d fit into holes formed in the bottom surface of the digital camera 10. The movable pins 12c and 12d are forcefully inserted against resilient force along with attachment of the digital camera 10. Limitations are imposed on longitudinal and lateral movements of the movable pins 12c and 12d. Hence, the digital camera 10 is connected to the connector 12a while being subjected to longitudinal and lateral positional restrictions above the printer dock 12.

Figure 2:
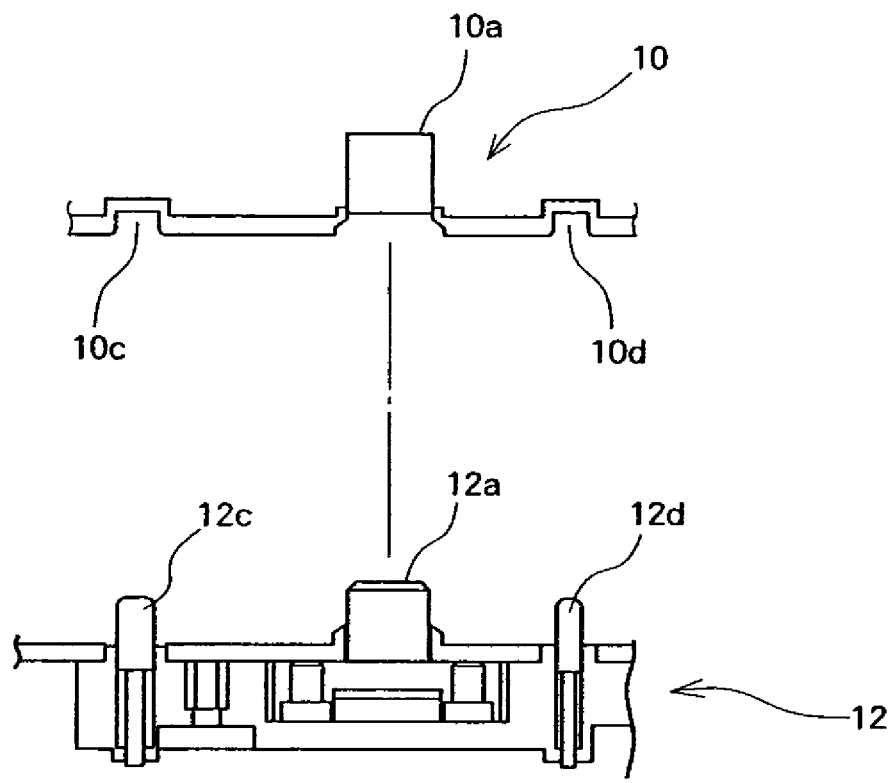
FIG. 2 is a view showing a state of a movable pin achieved before attachment of a digital camera.
Figure 3:
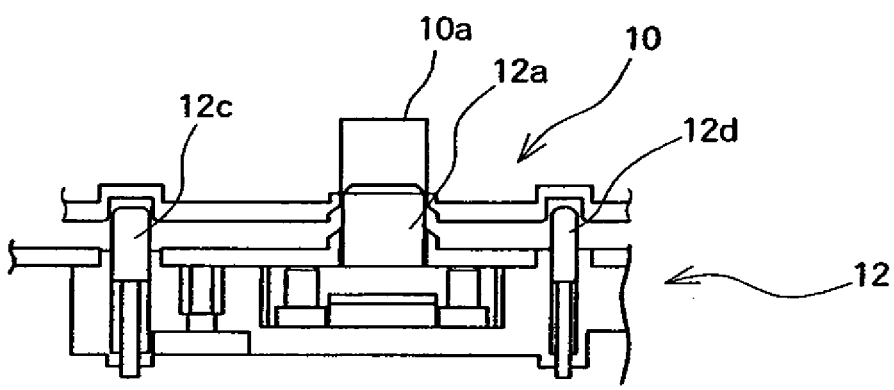
FIG. 3 is a view showing a state of the movable pin achieved at the time of attachment of the digital camera.
Figure 4:
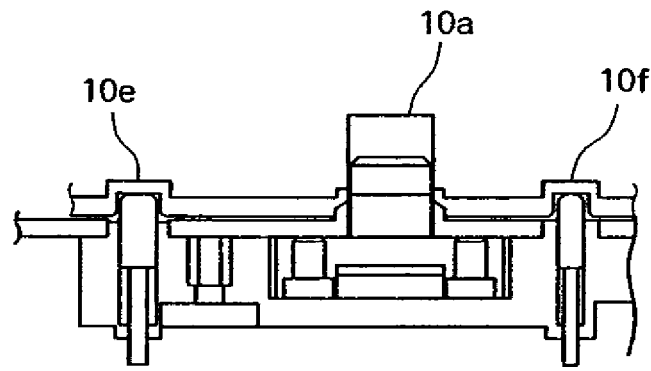
FIG. 4 is a view showing a state of the movable pin achieved after attachment of the digital camera.

FIGS. 2 through 4 show the states of the movable pins 12c and 12d achieved at the time of attachment of the digital camera 10. FIG. 2 shows the state of the digital camera 10 achieved before attachment of the same. The movable pins 12c and 12d are impelled upwardly by means of springs inserted into a stepped section. Further, the heights of the movable pins 12c and 12d are restricted by means of E rings provided at the bottoms of the movable pins. In addition to the connector 10a, holes 10c and 10d are formed in the digital camera 10, wherein the movable pins 12c and 12d are fitted to the bottoms of the respective holes 10c and 10d. FIG. 3 shows the state of the printer dock when the digital camera 10 is attached to the dock. At the time of attachment of the digital camera 10, the leading ends of the movable pins 12c and 12d enter the holes 10c and 10d formed in the bottom surface of the digital camera 10. In this state, the user presses the digital camera 10 downward. Since the longitudinal, lateral movements of the movable pins 12c and 12d are restricted, the user depresses the digital camera 10 while using the movable pins 12c and 12d as guides. Since the movable pins 12c and 12d are formed after adjustment of the relative positional relationship of the movable pins 12c, 12d and the connector 12a, the connector 10a of the digital camera 10 accurately opposes the connector 12a of the printer dock 12 as a result of the digital camera 10 being pushed while the movable pins 12c and 12d are taken as a guide. FIG. 4 shows the state of the printer dock 12 achieved after attachment of the digital camera 10. The movable pins 12c, 12d fit into the bottom surface of the digital camera 10 by means of pin-receiving sections 10e, 10f provided on the bottom surface of the digital camera 10. After attachment of the digital camera 10, the movable pins 12c and 12d play the role of protecting the connector 12a. A required depth to which the movable pins 12c and 12d fit into the bottom surface of the digital camera 10 is determined by the geometry of the camera.

As mentioned above, the movable pins 12c and 12d are provided on both sides of the connector 12a such that the connector 12a is sandwiched between the movable pins. As a result of the digital camera 10 being attached to the printer dock 12 while the movable pins 12c and 12d are taken as guides, attachment of the custom insert is obviated.

Figure 5:
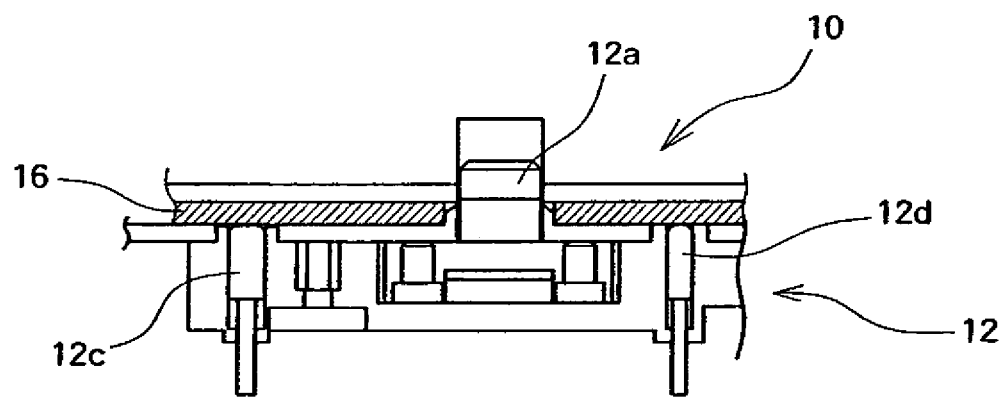
FIG. 5 is a view showing a state of the movable pin when a custom insert is in use.
Figure 21:
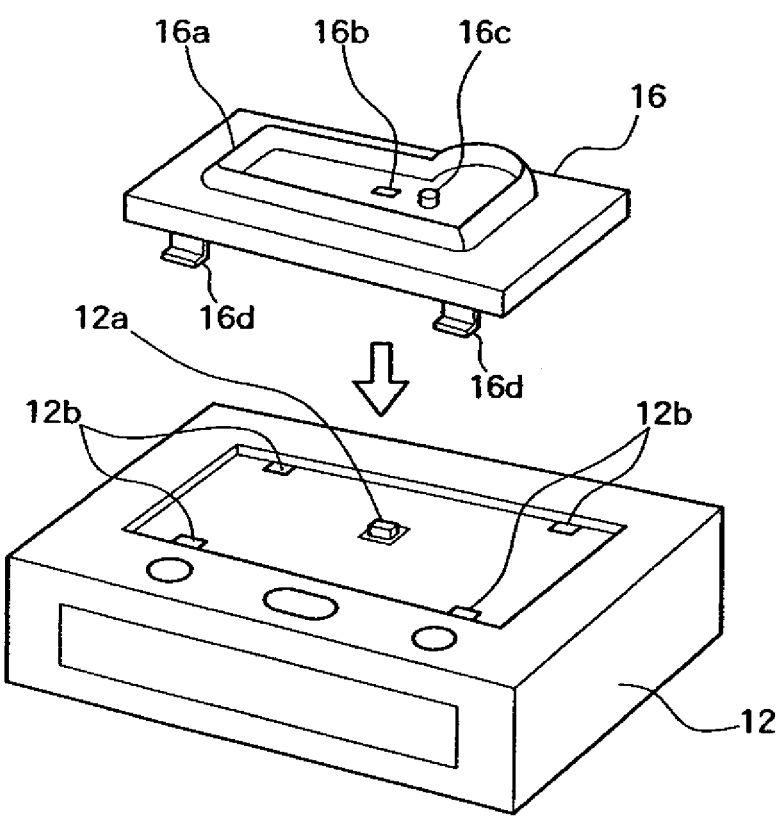
FIG. 21 is a perspective view of a custom insert.

Since some users are accustomed to use of the custom insert 16, there may also arise a case where use of the custom insert 16 is desired. Even in such a case, the desire can be addressed by means of setting the extent to which the movable pins 12c, 12d sink to a level which does not hinder attachment of the custom insert 16. FIG. 5 shows the configuration of the printer dock 12 employed when the custom insert 16 shown in FIG. 21 is attached to the printer dock 12 and the digital camera 10 is additionally attached to the same. The extent to which the movable pins 12c and 12d sink has been determined in advance in consideration of the thickness of the custom insert 16; i.e., the pins sink to such an extent that the connector of the digital camera 10 can be connected to the dock-side connector 12a via the custom insert 16. As a result, the custom insert 16 can be attached to the printer dock 12, and the digital camera 10 can be connected to the connector 12a.

Second Embodiment

In the first embodiment, the two movable pins 12c and 12d are configured so as to be movable in only the vertical direction. However, any of the movable pins may also be configured so as to be movable in the longitudinal or lateral direction as well.

Figure 6:
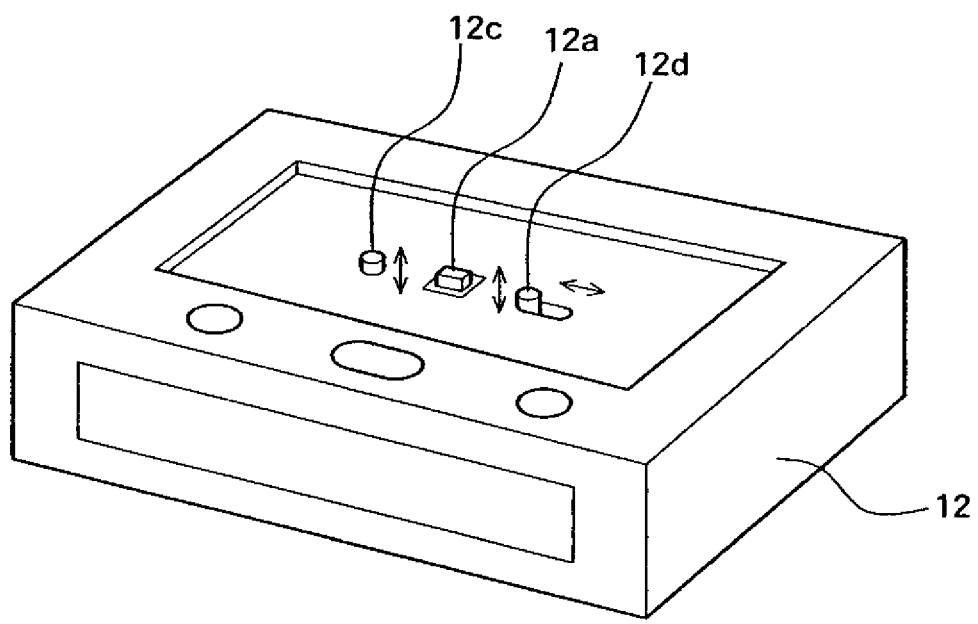
FIG. 6 is a perspective view of a printer dock of another embodiment of the present invention.
Figure 7:
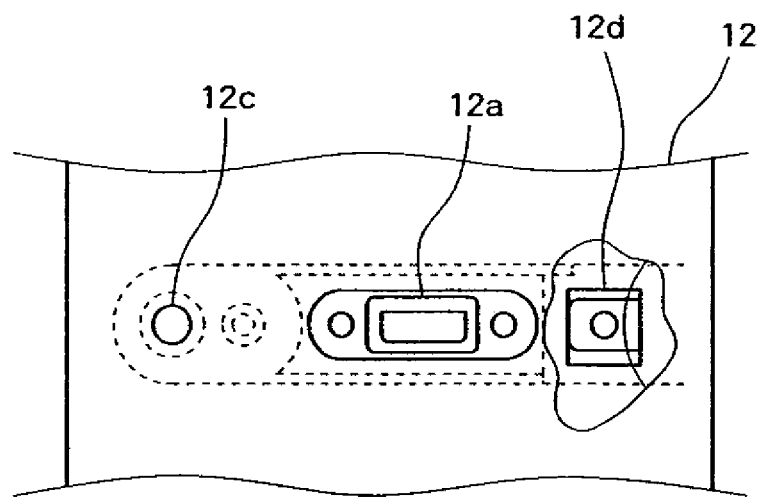
FIG. 7 is a plan view of the dock.
Figure 8:
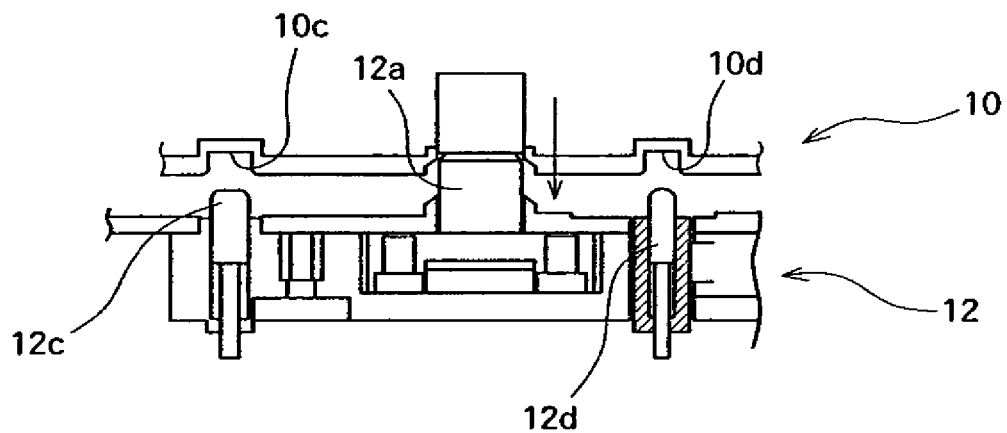
FIG. 8 is a view showing a state of a movable pin achieved at the time of attachment of the digital camera.
Figure 9:
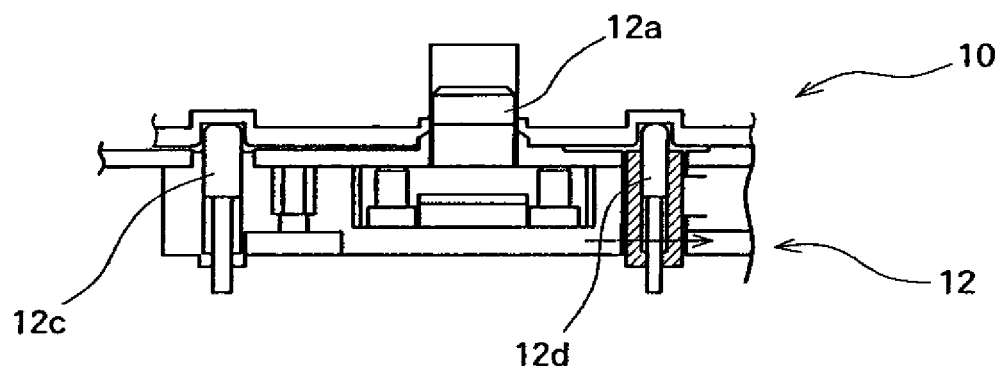
FIG. 9 is a view showing a state of the movable pin achieved after attachment of the digital camera.

FIG. 6 shows a case where the movable pin 12d of the movable pins 12c and 12d is configured so as to be movable in the lateral direction as well as in the vertical direction. The movable pin 12d is impelled upwardly in a stable state by means of a spring, and is impelled toward the connector 12a by means of the spring. FIGS. 7 through 9 show the states of the movable pins 12c and 12d achieved at the time of attachment of the digital camera 10. As indicated by the plan view of FIG. 7, the movable pins 12c and 12d are positioned on both sides of the connector 12a. As shown in FIG. 8, at the time of attachment of the digital camera 10, the movable pin 12c enters the hole 10c formed in the bottom of the digital camera 10. Meanwhile, the movable pin 12d is impelled toward the connector 12a by means of the spring, and the movable pin 12d is situated at a position slightly closer to the connector 12a than to the hole 10d. Accordingly, at the time of attachment of the digital camera 10, the extremity of the movable pin 12d comes into contact with the brim of the hole 10d. Pursuant to depression of the digital camera 10, the movable pin 12 receives the force in a direction departing from the connector 12a, and moves in the direction departing from the connector 12a against the restoration force of the spring. FIG. 9 shows the state of the printer dock 12 achieved after attachment of the digital camera 10. As indicated by the arrow in the drawing, the movable pin 12d is pressed into the hole 10d so as to move in the direction departing from the connector 12a. Consequently, the movable pin 12d is pressed against the side surface of the hole 10d by means of the spring, and the digital camera 10 is held by means of the pressing force exerted by the movable pin 12d.

Third Embodiment

In the first and second embodiments, the digital camera 10 is attached to the printer dock 12 while the two vertically-movable pins 12c, 12d formed in the printer dock 12 are used as guides. However, the movable pins 12c, 12d can also be caused to serve as guides which vertically actuate the attachment surface of the printer dock 12 in place of the movable pins.

Figure 10:
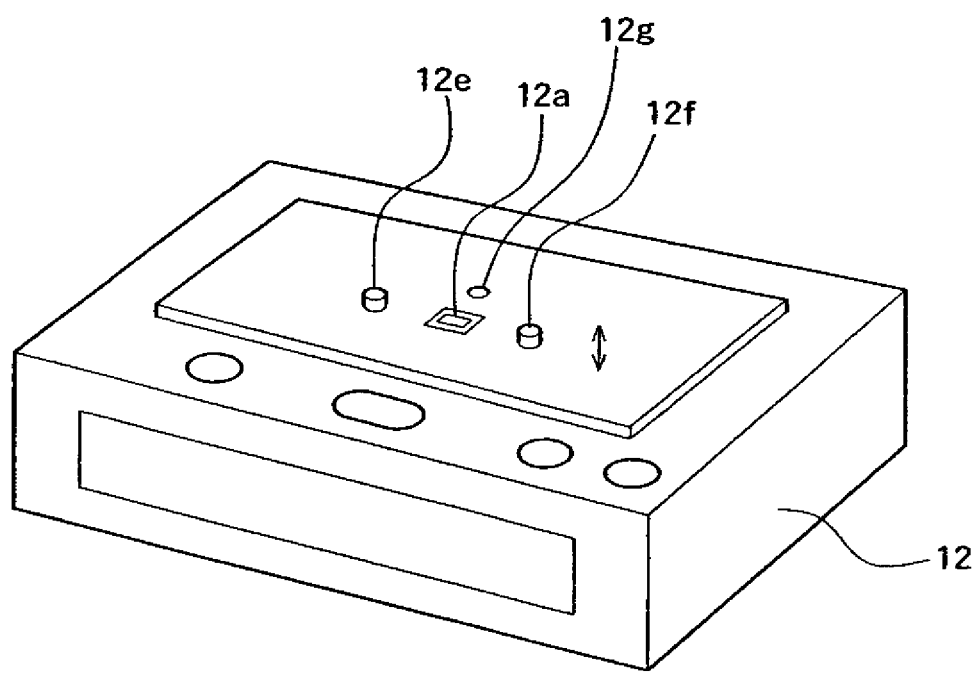
FIG. 10 is a perspective view of a printer dock of still another embodiment of the present invention.

FIG. 10 shows a configuration for guiding the digital camera 10 by means of vertical actuation of the attachment surface. An opening is formed at a position on the attachment surface of the printer dock 12 facing the connector 12a, and the connector 12a is exposed through the opening. Fixing pins 12e and 12f are formed on respective sides of the opening of the connector 12a on the attachment surface. The fixing pins 12e and 12f have the minimum height required when serving as guides during attachment of the digital camera 10. The fixing pins engage with holes formed in the bottom of the digital camera 10, to thus define the attachment position of the digital camera 10 to a certain extent. In a stable state, the attachment surface is impelled upwardly by means of a spring and is fixed in an elevated position by means of a latch. When the digital camera 10 is attached to the two fixing pins 12e and 12f, a first button 12g used for releasing the latch that restricts the vertical movement of the attachment surface is depressed by the bottom surface of the digital camera 10, whereby the latch is released to thus bring the attachment surface into a downwardly-movable state. By means of downward movement of the attachment surface, the connector 12a becomes exposed upwardly through the inside of the opening formed in the attachment surface, thereby establishing a connection with the connector of the digital camera 10.

Figure 11:
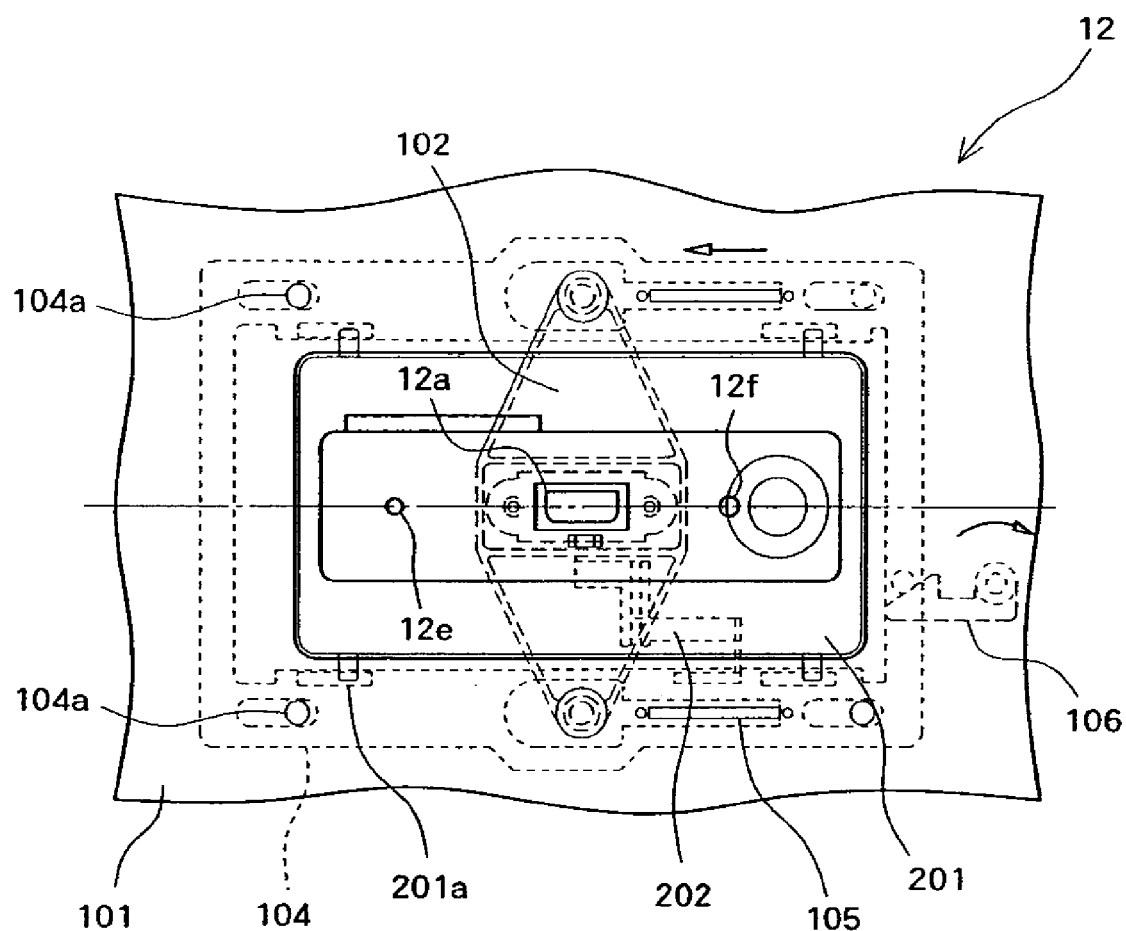
FIG. 11 is a plan view of the dock.
Figure 12:
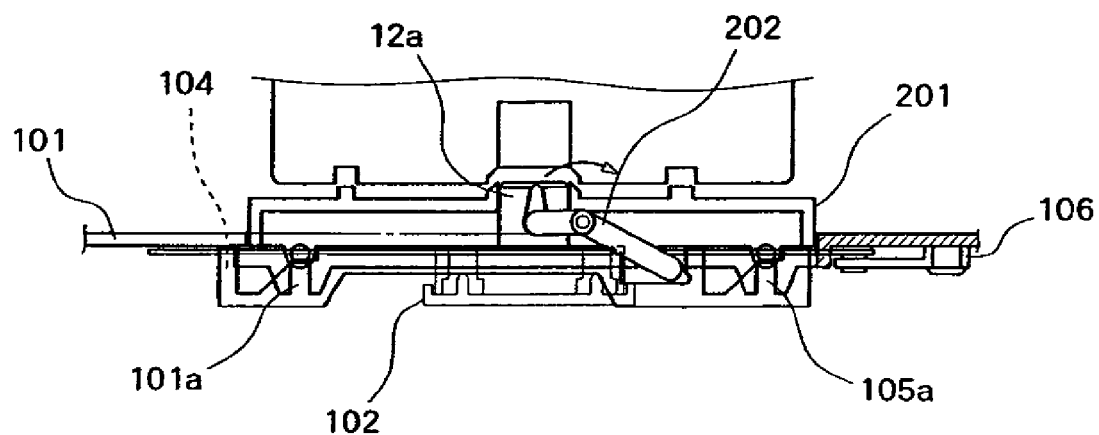
FIG. 12 is a block diagram of a trigger lever.

FIG. 11 shows a plan view of the printer dock 12. FIG. 12 shows the configuration of the latch mechanism shown in FIG. 11. A connector holder 102 is fastened to a dock case 101 of the printer dock 12 and provided with the connector 12a. The dock case 101 is equipped with a slide plate 104 used for vertically actuating a camera support plate 201. The slide plate 104 is restricted by four bosses 104a provided on the dock case 101 and horizontally actuated in the drawing. The slide plate 104 is impelled in the direction of the arrow in the drawing by means of a spring 105. The slide plate 104 operates in synchronism with a latch 106 provided on the dock case 101. The latch 106 undergoes rotational force in the direction of the arrow in the drawing by means of an unillustrated spring. Four bosses 201a are provided, two on the right and the other two on the left, on the camera support plate 201 that is vertically actuated along with the digital camera 10 on the dock case 101. The camera support plate 201 is vertically actuated along with vertical grooves 101a formed in the dock case. The four bosses 201a are supported by the flat surface of the slide plate 104 and a sloped section 105a. When the boss 201a is supported on the flat surface of the slide plate 104, the camera support plate 201 is held in an elevated first position. When the slide plate 104 has moved and the boss 201a is supported on the sloped surface of the slide plate 104, the boss 201a can move along the slope; namely, the boss 201a can move downwardly along a vertical groove 101a. When the boss 201a has reached the bottom of the vertical groove 101a, the camera support plate 201 is held in a lower, second position. A trigger lever 202 is attached to the camera support plate 201, and actuation of the slide plate 104 is commenced by means of movement of the bottom of the digital camera 10. Specifically, an attachment-side protuberance of the trigger lever 202 is brought into contact with the bottom of the digital camera by means of pushing action of the digital camera 10. The trigger lever 202 is pivoted around a shaft by means of the pressing force originating from the bottom of the digital camera. By means of rotation of the trigger lever 202, the slide plate 104 is actuated in the rightward direction, thereby changing a positional relationship with the bosses 201a. The trigger lever 202 undergoes force in the direction of the arrow originating from an unillustrated spring.

Figure 13:
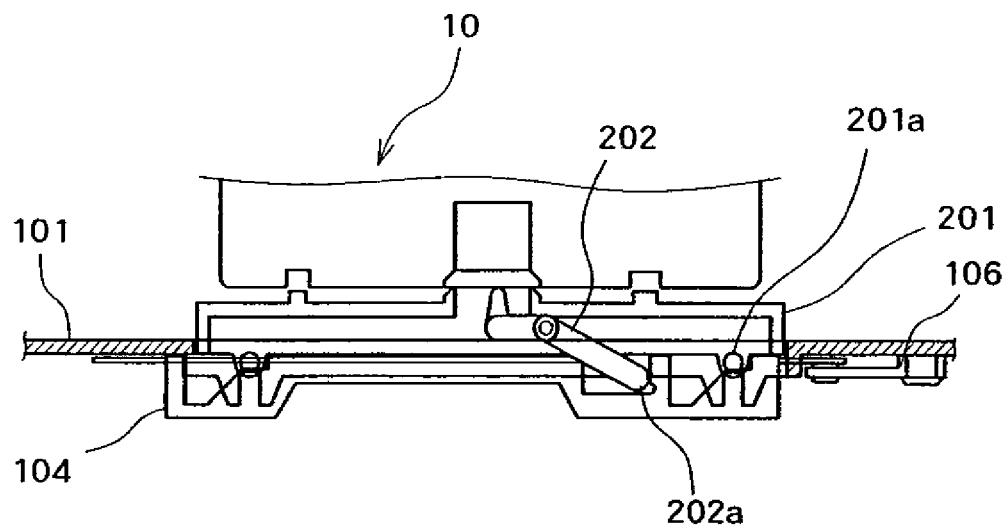
FIG. 13 is state descriptive view (Part 1) of the trigger lever achieved at the time of attachment of the digital camera.

FIGS. 13 through 17 show operation performed during attachment of the digital camera 10. First, as shown in FIG. 13, the bosses 201a of the camera support plate 201 are supported on the flat surface of the slide plate 104 in a stable state. The camera support plate 201 is situated at an elevated first position. Since the slide plate 104 undergoes restoration force of the spring 105 in the leftward direction of the drawing, the camera support plate 201 is held in the first position. The digital camera 10 is attached in this state while the fixing pins 12e and 12f on the camera support plate 201 are taken as guides.

Figure 14:
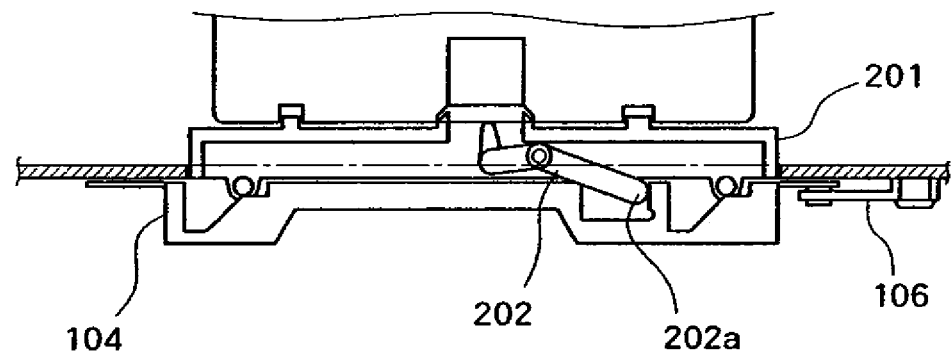
FIG. 14 is state descriptive view (Part 2) of the trigger lever achieved at the time of attachment of the digital camera.

As shown in FIG. 14, when the digital camera 10 is attached, the bottom of the digital camera 10 comes into contact with the protuberance of the trigger lever 202 provided on the camera support plate 201, to thus depress the trigger lever 202. The trigger lever 202 pivots around the shaft provided on the camera support plate 201, and an edge portion 202a of the trigger lever 202 is brought into contact with the slide plate 104 by means of rotational movement, whereupon the slide plate 104 is moved in the rightward direction of the drawing.

Figure 15:
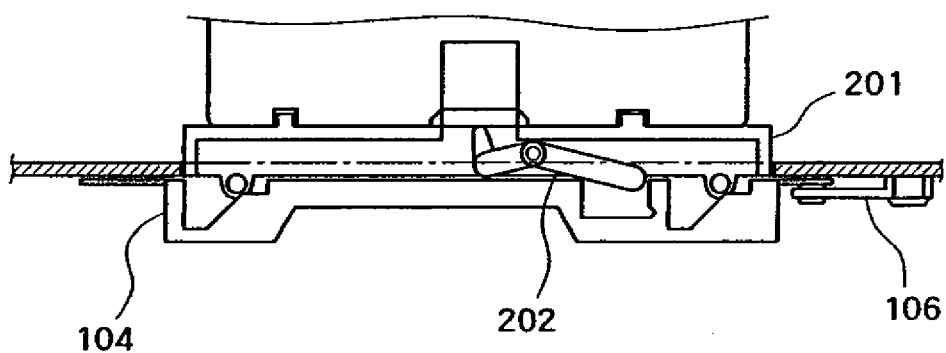
FIG. 15 is state descriptive view (Part 3) of the trigger lever achieved at the time of attachment of the digital camera.

As shown in FIG. 15, when the digital camera 10 is pushed further, the slide plate 104 is continually moved in the rightward direction by means of the trigger lever 202. By means of movement of the slide plate 104, the four bosses 201a formed in the camera support plate 201 are moved to the slope section from the flat surface section on the slide plate 104. As a result, the camera support plate 201 can be moved downwardly.

Figure 16:
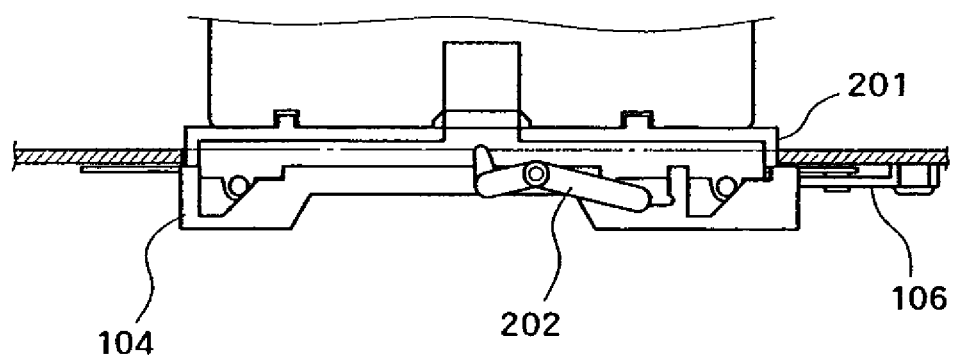
FIG. 16 is state descriptive view (Part 4) of the trigger lever achieved at the time of attachment of the digital camera.

Next, as shown in FIG. 16, the slide plate 104 is moved rightward against the restoration force of the spring 105 by means of the bosses 104a of the camera support plate 201, by means of operation for further pushing the digital camera 10. When pushing of the digital camera 10 is aborted in this state and the digital camera 10 is lifted, the slide plate 104 is restored to the state shown in FIG. 13 by means of the spring 105.

Figure 17:
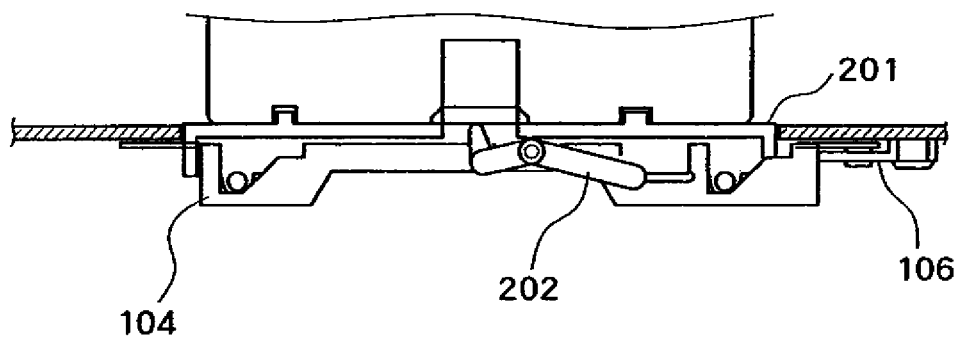
FIG. 17 is state descriptive view (Part 5) of the trigger lever achieved at the time of attachment of the digital camera.

Finally, as shown in FIG. 17, when the digital camera 10 is pushed to a predetermined position, the latch 106 provided on the dock case 101 acts so as to latch the slide plate 104. Thus, the slide plate 104 is locked, and attachment of the digital camera 10 is maintained.

During removal of the digital camera 10, the latch 106 is released by means of operating an unillustrated button, whereby the slide plate 104 is moved leftward by means of restoration force of the spring 105. Upward movement of the camera support plate 201 is allowed, to thus disengage the connection of the connector.

As mentioned above, the vertical movement of the camera support plate 201 is restricted by the slide plate 104. Downward movement of the camera support plate 201 is allowed when the digital camera 10 is attached and pushed. When the digital camera 10 has been pushed down to a predetermined position, the slide plate 104 is locked, thereby enabling reliable connection of the connector 10a of the digital camera 10 with the dock-side connector 12a.

Figure 18:
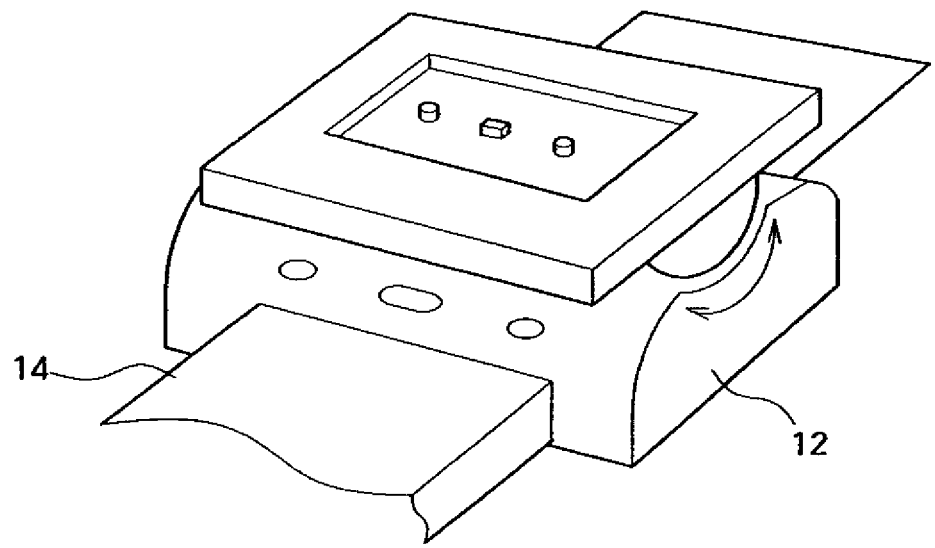
FIG. 18 is a descriptive view of a dock whose attachment surface is tiltable.
Figure 19:
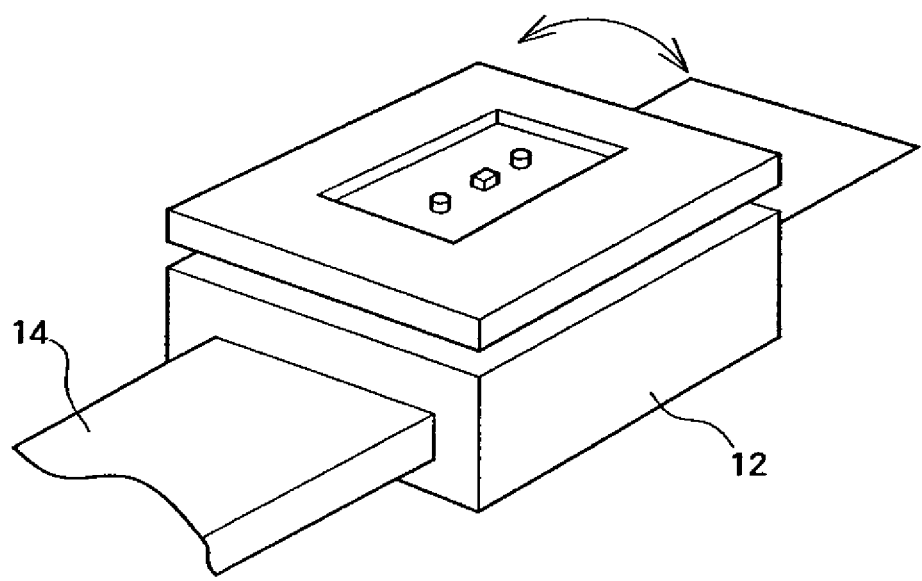
FIG. 19 is a descriptive view of a dock whose attachment surface is rotatable.
Figure 20:
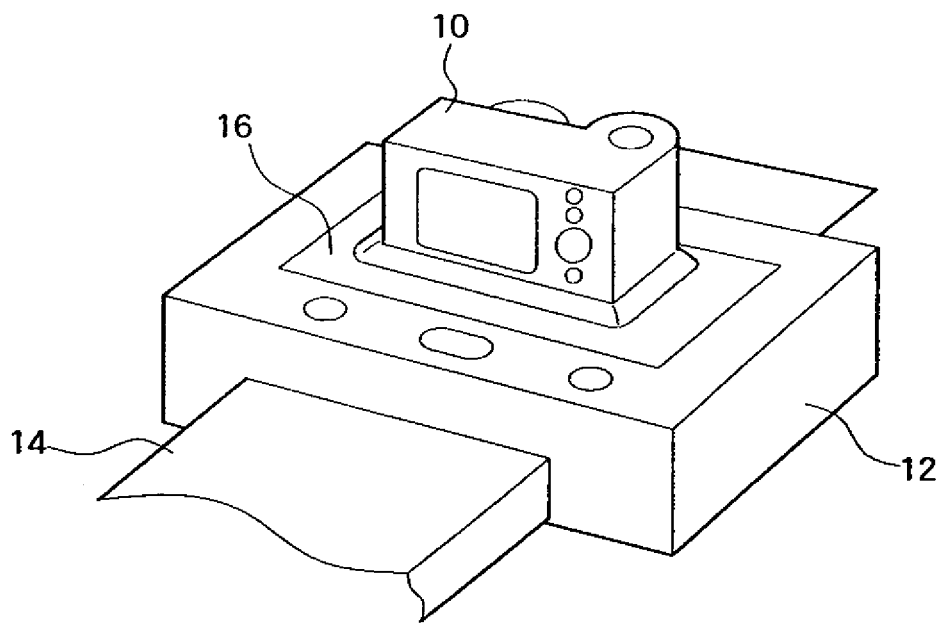
FIG. 20 is a descriptive view of the digital camera attached to the dock.

In the present embodiment, the attachment surface of the dock can also be made tiltable through only an arbitrary angle as shown in FIG. 18, or rotatable within a horizontal plane through only an arbitrary angle as shown in FIG. 19.

The invention has been described in detail with particular reference to certain preferred embodiments thereof, but it will be understood that variations and modifications can be effected within the spirit and scope of the invention.

PARTS LIST 10 digital camera
10a connector
10c hole
10d hole
10e pin receiving section
10f pin receiving section
12 printer dock
12a connector
12b hole
12c movable pin
12d movable pin
12e fixing pin
12f fixing pin
12g first button
14 print sheet tray
16 custom insert
16a guide wall
16b opening section
16c protuberance section
16d hook
101 dock case
101a vertical groove
102 connector
104 slide plate
104a boss
105 spring
105a sloped section
106 latch
201 camera support plate
201a boss
202 trigger lever
202a edge portion

The invention claimed is:

1. A dock comprising:
a connector configured to establish an electrical connection with an image capture device;
two movable pins located in the vicinity of the connector and supported in an impelled manner, such that the two movable pins are configured to move vertically; and
a surface configured to have the image capture device secured thereto the connector and the movable pins, wherein the two movable pins project and are impelled upwardly in a stable state, and the two movable pins are configured to fit into hole sections formed in a bottom of the image capture device during docking of the image capture device, and the two movable pins are configured to move downwardly along with the image capture device to thus act as guides for regulating a relative position between the image capture device and the connector;
wherein at least one of the two movable pins is configured to move both vertically and laterally, which lateral movement holds the image capture device in the dock by pressing against a side surface of a receiving receptacle of the image capture device independent of a latch and which lateral movement is caused pursuant to depression of the image capture device into the dock.

2. The dock of claim 1, wherein the at least one of the two movable pins is a cylindrical-shaped pin which holds the image capture device by a pressing force.

3. The dock of claim 2, wherein the receiving receptacle is a hole in the image capture device and the cylindrical-shaped pin exerts the pressing force against a side surface of the hole.

4. The dock of claim 1, wherein the at least one of the two movable pins is configured to move laterally by means of a spring.

5. The dock of claim 1, wherein the two movable pins are configured to move vertically by means of springs.

6. A docking station comprising:
a connector configured to establish an electrical connection with an electrical device;
two movable pins located in the vicinity of the connector and configured to move vertically; and
a surface surrounding the connector and the movable pins, wherein the two movable pins project and are impelled upwardly from the surface in a stable state, and wherein the two movable pins are configured to fit to hole sections in the electrical device during docking of the electrical device, and the two movable pins are configured to move downwardly along with the electrical device to thus act as guides for regulating a relative position between the electrical device and the connector;

wherein at least one of the two movable pins is configured to move both vertically and laterally, which lateral movement secures the electrical device in the docking station by pressing against a side surface of a receiving receptacle of the electronic device, wherein the lateral movement is independent of a latch and which lateral movement is caused pursuant to depression of the electrical device into the docking station.

7. The docking station of claim 6, wherein the at least one of the two movable pins is a cylindrical-shaped pin which secures the digital camera by a pressing force.

8. The docking station of claim 6, wherein the receiving receptacle is a hole in the electrical device, and the cylindrical-shaped pin exerts the pressing force against a side surface of the hole.

9. The docking station of claim 6, wherein the at least one of the two movable pins is configured to move laterally by means of a spring.

10. The docking station of claim 6, wherein the two movable pins are configured to move vertically by means of springs.

* * * * *